US012377436B2

(12) United States Patent
Ayrle et al.

(10) Patent No.: US 12,377,436 B2
(45) Date of Patent: Aug. 5, 2025

(54) CARTRIDGE FOR A DISPENSING DEVICE

(71) Applicant: Hilti Aktiengesellschaft, Schaan (LI)

(72) Inventors: Thomas Ayrle, Langerringen (DE); Ralf Willner, Tussenhausen (DE); Tobias Donner, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 212 days.

(21) Appl. No.: 17/755,845

(22) PCT Filed: Dec. 1, 2020

(86) PCT No.: PCT/EP2020/084105
§ 371 (c)(1),
(2) Date: May 10, 2022

(87) PCT Pub. No.: WO2021/115843
PCT Pub. Date: Jun. 17, 2021

(65) Prior Publication Data

US 2022/0379340 A1 Dec. 1, 2022

(30) Foreign Application Priority Data

Dec. 13, 2019 (EP) .................................... 19216070

(51) Int. Cl.

| | |
|---|---|
| ***B05C 17/005*** | (2006.01) |
| ***B65D 81/32*** | (2006.01) |
| ***B65D 83/00*** | (2006.01) |

(52) U.S. Cl.
CPC .. *B05C 17/00583* (2013.01); *B05C 17/00553* (2013.01); *B65D 81/3288* (2013.01); *B65D 83/771* (2025.01)

(58) Field of Classification Search
CPC ............ B65D 83/0055; B65D 83/0072; B05C 17/00583; B05C 17/00553; B05C 17/00586; B05C 17/00596
(Continued)

(56) References Cited

U.S. PATENT DOCUMENTS 5,332,122 A * 7/1994 Herold .............. B05C 17/00583 222/326
5,501,368 A * 3/1996 Brandhorst ............. B05C 17/01 222/326
(Continued)

FOREIGN PATENT DOCUMENTS

DE 20 2018 105 661 U1 1/2019

OTHER PUBLICATIONS

International Search Report dated Feb. 18, 2021 in PCT/EP2020/084105, with English translation, 7 pages.
(Continued)

*Primary Examiner* — Charles P. Cheyney
(74) *Attorney, Agent, or Firm* — Grüneberg and Myers PLLC

(57) ABSTRACT

A cartridge for a dispensing device has at least one inherently non-rigid, elongate film pouch, which has a chamber for receiving a composition. The cartridge also has a head part for interacting with the film pouch. The head part has an inherently rigid insert, which is connected to the film pouch on a side facing the head part. A connecting device is provided, which can connect the insert to the head part in a form-fitting and/or force-fitting manner. The insert has at least one first connecting element of the connecting device and the head part has at least one second connecting element of the connecting device.

19 Claims, 5 Drawing Sheets

(58) Field of Classification Search
USPC .................................................... 222/95, 105
See application file for complete search history.

(56) References Cited

U.S. PATENT DOCUMENTS

| | | | | |
|---|---|---|---|---|
| 5,647,510 | A * | 7/1997 | Keller | B05C 17/00513 222/105 |
| 5,667,102 | A * | 9/1997 | Keller | B05C 17/01 222/327 |
| 5,873,492 | A * | 2/1999 | Sullivan | B05C 17/0052 222/105 |
| 5,873,970 | A | 2/1999 | Konuma et al. | |
| 6,158,621 | A * | 12/2000 | Keller | B05C 17/00553 222/137 |
| 6,299,022 | B1 * | 10/2001 | Bublewitz | B05C 17/00506 222/326 |
| 6,352,177 | B1 * | 3/2002 | Bublewitz | B01F 27/0724 222/137 |
| 6,644,509 | B1 * | 11/2003 | Bublewitz | B05C 17/00506 222/88 |
| 6,796,460 | B2 * | 9/2004 | Ichikawa | B65D 35/30 222/391 |
| 9,217,342 | B2 * | 12/2015 | Eisenbacher | F01M 11/0458 |
| 2008/0127616 | A1 | 6/2008 | Matsumura et al. | |
| 2014/0124533 | A1 * | 5/2014 | Melia | B05C 17/00583 222/105 |
| 2014/0203023 | A1 | 7/2014 | Ettlin | |
| 2015/0114986 | A1 * | 4/2015 | Ngu | B05C 17/00583 222/137 |
| 2019/0022694 | A1 | 1/2019 | Dean et al. | |

OTHER PUBLICATIONS

Written Opinion dated Feb. 18, 2021 in PCT/EP2020/084105, with English translation, 9 pages.

* cited by examiner

CARTRIDGE FOR A DISPENSING DEVICE

CROSS-REFERENCE TO RELATED APPLICATIONS

This application is the National Stage entry under § 371 of International Application No. PCT/EP2020/084105, filed on Dec. 1, 2020, and which claims the benefit of priority to European Application No. 19216070.3, filed on Dec. 13, 2019. The content of each of these applications is hereby incorporated by reference in its entirety.

BACKGROUND OF THE INVENTION

Field of the Invention

The present invention relates to a cartridge for a dispensing device according to the type described in more detail further below.

Description of Related Art

Cartridges are primarily used for storing material such as glue, sealing compound, mortar, paint or lubricants. In addition, the material can easily be applied to an object via the cartridges, provided that the cartridge is inserted into a corresponding dispensing device. The material can be applied precisely using the dispensing device. For example, a rod of the ejection device presses against a base of the cartridge, as a result of which the volume of the cartridge is compressed, such that the material located in the cartridge is pressed out of an opening. An attachment can be attached to the cartridge so that the material can be applied to the object in a controlled and precise manner.

Cartridges are known which have an inherently non-rigid film pouch which is connected at one end to an inherently rigid insert. The inherently rigid insert can in turn be brought into operative connection with a head part to which, for example, a static mixer can be attached. In known designs, the insert is attached to the head part by means of an adhesive connection.

This has the disadvantage that a position of the insert and thus of the film pouch on the head part cannot be exactly reproduced. This can lead to an uneven and undefined opening behavior with an undesirably large amount of mass being discarded.

SUMMARY OF THE INVENTION

The object of the invention is to provide a cartridge in which exact positioning of the insert relative to the head part can be achieved in a simple manner.

This object is achieved by means of the subject matter as described below. Advantageous embodiments relating to the subject matter can be found further below.

A cartridge for a dispensing device is proposed, the cartridge having at least one inherently non-rigid, elongate film pouch, which has a chamber for receiving a composition, having a head part for interacting with the film pouch and having an inherently rigid insert, the insert being connected to the film pouch on a side facing the head part.

According to the invention, a connecting device is provided, by means of which the insert can be connected to the head part in a form-fitting andior force-fitting manner, the insert having at least one first connecting element of the connecting device and the head part having at least one second connecting element of the connecting device.

The solution according to the invention has the advantage that, in a structurally simple manner, very precise positioning of the insert, in particular in the longitudinal direction of the film pouch, with respect to the head part can be achieved. In this way, for example, an opening behavior of the film pouch can be reproduced very precisely and a uniform and controllable opening behavior can be achieved with an advantageously small amount of waste. Due to the exact positioning of the insert with respect to the head part, a particularly tight connection of the insert with respect to the head part can also be achieved, since the film pouch is pressed particularly far in the direction of the head part during a dispensing process. In addition, a connection according to the invention of the insert to the head part by means of the connecting device is cost-effective and reliable.

DETAILED DESCRIPTION OF THE INVENTION

Figure 1:
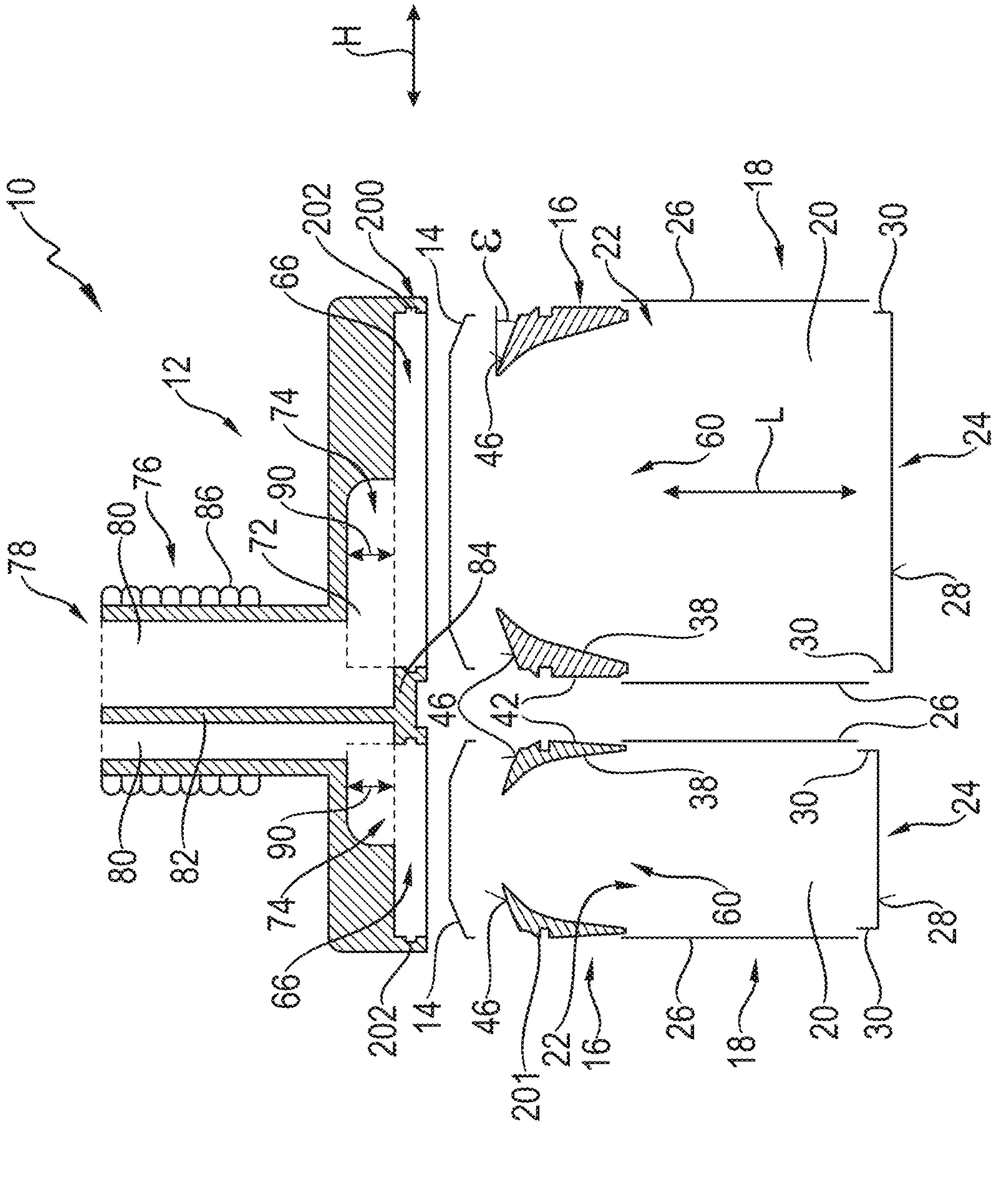
FIG. 1 shows a longitudinal section through a cartridge according to the invention in a first embodiment in an exploded view.

In an advantageous embodiment of a cartridge according to the invention, the connecting device is detachable. This makes it possible to exchange faulty components in a simple manner, for example. Furthermore, a detachable connecting device, by means of a corresponding design of the connecting device, can be used to ensure that the connecting device is released when a defined force is applied. In this way, for example, damage to the head part, the insert andior the film pouch can be prevented and a detached film pouch can then be reconnected to the head part or the connector by means of the insert.

In a simple embodiment of the invention, the connecting device is designed as a latching connection or a snap connection or the like. The first connecting element can be designed, for example, as a latching element that can be brought into engagement with the second connecting element, designed as a counter-latching element, or vice versa. This achieves a simple arrangement of the insert on the head part, it also being possible to fix a position of the insert in the longitudinal direction of the cartridge with respect to the head part particularly precisely and in a defined manner.

The connecting device can, for example, have a latching lug which extends completely around the circumference in the circumferential direction and which interacts with a corresponding counter-element of the connecting device. It is possible that the first connecting element or the second connecting element is designed as a latching lug and the second connecting element or the first connecting element as a counter-element, for example in the form of a groove, a channel, a recess or the like.

If a connecting element of the connecting device has a positioning element, a position of the insert relative to the head part can be fixed in a defined manner in the circumferential direction and in particular a rotation of the insert relative to the head part can be prevented in a simple manner. The positioning element can be designed, for example, as a ridge or the like. If a connecting element is designed, for example, as a latching lug that extends almost completely in the circumferential direction, the position of the insert relative to the head part in the circumferential direction can be fixed in a defined manner by the other connecting element, designed for example as a latching slot having a ridge. The positioning element interacts, for example, with at least one latching lug representing a counter-element, In order to reliably prevent the insert from rotating relative to the head part, a plurality of first latching elements of the latching connection can be provided, which elements can be brought into engagement with a plurality of second latching elements of the latching connection, In this case, for example, several ridges are provided which particularly reliably prevent the insert from rotating relative to the head part.

In an alternative embodiment of the invention, the connecting device can be designed as a screw connection, a bayonet connection or the like.

In order to prevent undesired leakage of the composition located in the chamber out of the chamber in a simple manner, the insert can have a passage closed by a cover. The cover allows a simple and safe and, in particular, defined opening in order to be able to deliver the composition located in the chamber.

The film pouch can preferably be formed by a cylindrical film tube which is closed at the bottom by a base part, the base part being in particular glued and/or welded to the film tube. The film tube, also called tubular film or blown film, can be made of a thermoplastic material, and the film tube can be extruded or welded or glued at its longitudinal seam. Since the base part is in particular glued and/or welded, this produces an integral bond, which improves the storage properties of the cartridge, such that a leakage rate of the cartridge is reduced compared to a cartridge in which a film pouch is closed by a clip closure.

In an advantageous cartridge according to the invention, the head part is designed for connecting at least two inserts. Correspondingly, two, in particular inherently non-rigid fila pouches can be connected to the head part, and the film pouches in particular can have different compositions. The head part is preferably designed such that the different compositions can be guided separately from one another in the region of the head part up to the outlet opening, such that the different compositions can come into contact only after the outlet opening. This is important in the case of two-component adhesives, for example.

The cartridge can thus receive different compositions and serve as a multi-component packaging. In this case, it is possible that the outlet openings associated with the individual film pouches have diameters that differ from one another, such that a desired mixing ratio of the different compositions can be set in a simple manner.

The compositions located in the cartridge can be a chemical composition or a liquid, for example components of a two-component mixture.

Sealing compounds, multi-component mortars, multi-component coating compounds, multi-component paints, multi-component foam precursors, multi-component adhesives, multi-component sealing compounds and multi-component lubricants can be stored in the corresponding cartridges. It is possible for a resin, for example an epoxy resin, to be stored in one chamber and a curing agent for a two-component adhesive to be stored in the other chamber. The film pouches can have a comparable length, in which case a ratio of the bases of the film pouches determines a mixing ratio to be achieved. As an alternative to this, it is also possible for two film pouches to be used which have different lengths.

The receptacle of the head part can be assigned an expansion space into which the cover can expand. The expansion space makes it possible to open the cover in a controlled manner, so that it does not hinder the flow of the outflowing composition. On the one hand, this results in a laminar flow, since there are no obstacles in the flow path that could result in a turbulent flow. On the other hand, this ensures that the flow rate is precisely maintained, which is important for the mixing ratio of two or more components.

An “inherently rigid component” is understood to mean a component that retains its shape if it is removed from a device. Such a component is also referred to as inherently stable.

The head part in particular represents a type of adapter, since the head part allows commercially available attachments or standardized dispensing devices to be used to apply the composition located in the cartridge.

In an embodiment, the head part has an outlet nozzle that is in fluid connection with the receptacle. The outlet nozzle can define the flow rate, in particular via its diameter.

It is possible that the outlet nozzle has a thread. Commercially available attachments or dispensing devices for applying the composition located in the cartridge can be attached to the head part precisely at an outlet opening of the outlet nozzle by means of the thread, thus making it possible to precisely position and dose the composition during application.

The outlet nozzle can also have a partition which divides the volume into two or more outlet channels. The relative position of the partition in the outlet nozzle defines the cross-sections of the outlet channels and thus the flow rates through these outlet channels.

The outlet channels can have different diameters. The outlet channels can be oriented coaxially with respect to one another.

In one embodiment, the passage is tapered. As a result, the passage acts like a confusor or a nozzle when the composition flows out. The tapered passage can also act as a diffuser when the film pouch is filled.

The film pouch can preferably be evenly collapsed during a dispensing process, similar to an accordion, so that the entire composition in the chamber can be used as far as possible. When in use, the film pouch is exposed to chemical compositions or liquids which can sometimes act on the film pouch. An exact structure of the film pouch must therefore sometimes be adapted to the composition in the chamber or to the liquid in the chamber, in particular to the corresponding material properties.

Further advantages can be found in the following description of the drawings. Various embodiments of the present invention are shown in the drawings. The drawings and the description contain numerous features in combination. A person skilled in the art will expediently also consider the features individually and combine them to form meaningful further combinations.

Figure 2:
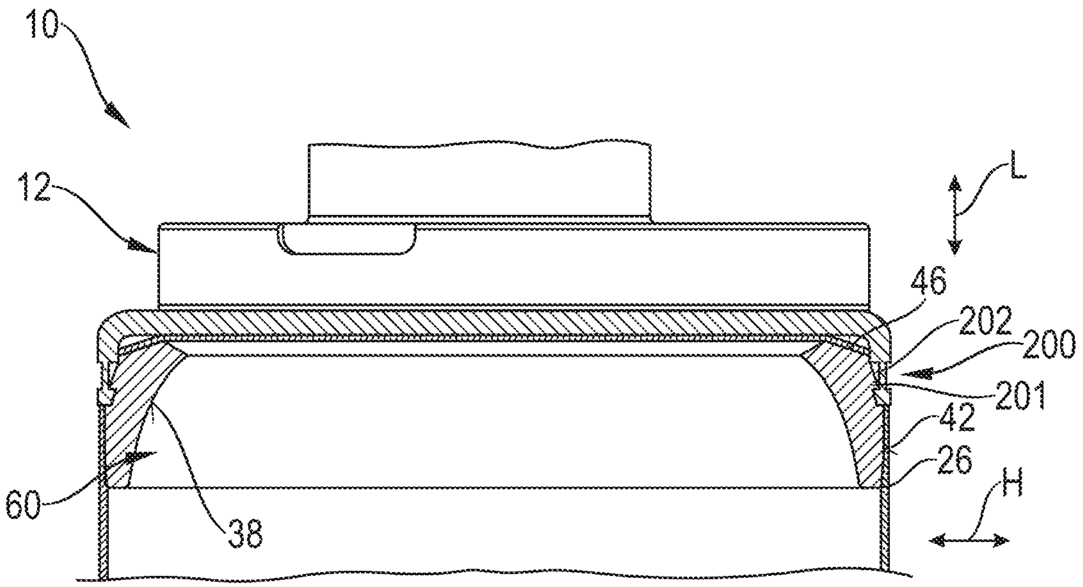
FIG. 2 shows a simplified sectional view of a detail of the cartridge according to FIG. 1 in the assembled position, where a connecting device for connecting an insert to a head part can be seen in more detail.
Figure 3:
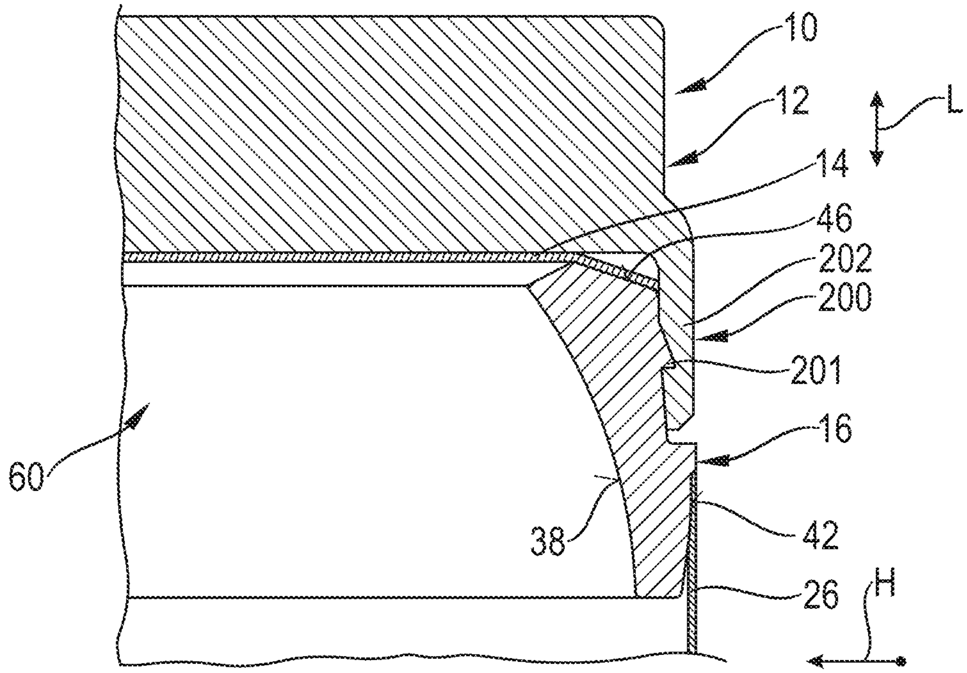
FIG. 3 shows a simplified view of a detail of the cartridge according to FIG. 2.
Figure 4:
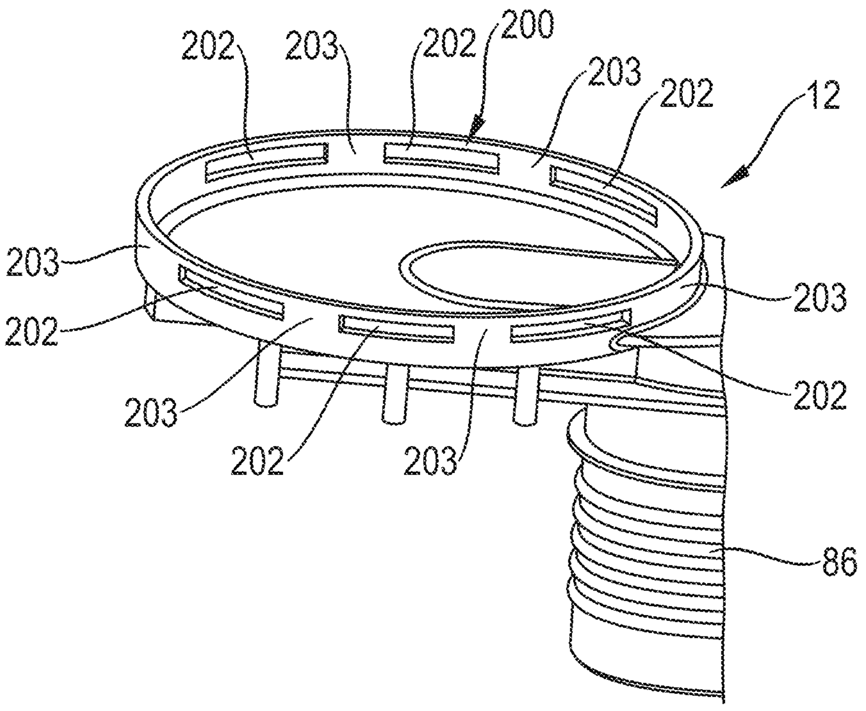
FIG. 4 shows a simplified three-dimensional view of a detail of the head part of the cartridge according to FIG. 2 in isolation.
Figure 5:
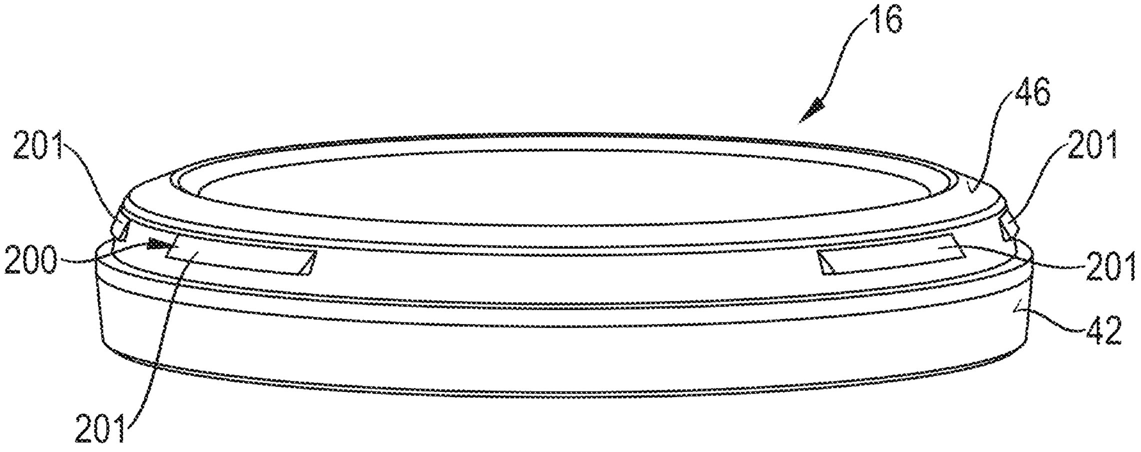
FIG. 5 shows a simplified three-dimensional view of the use of the cartridge according to FIG. 2 in isolation.
Figure 6:
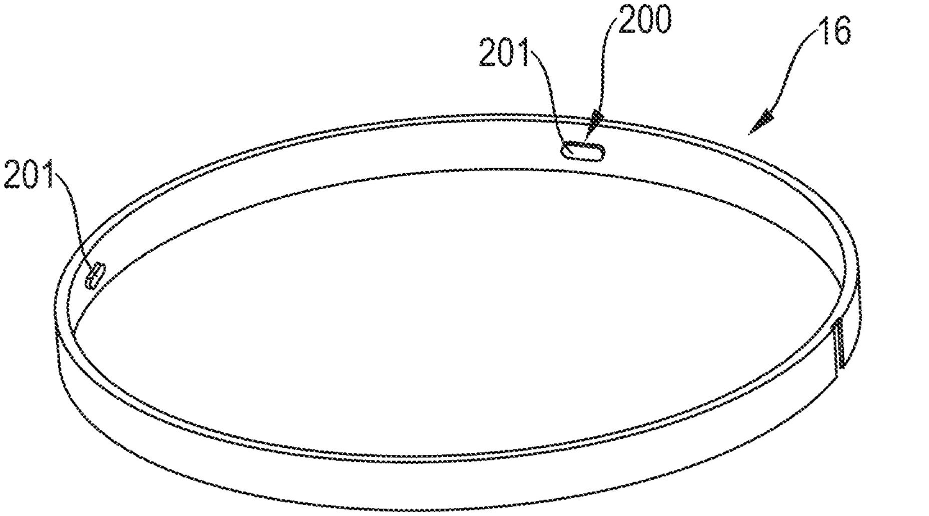
FIG. 6 shows a simplified three-dimensional view of an alternatively designed insert of a cartridge in isolation.
Figure 7:
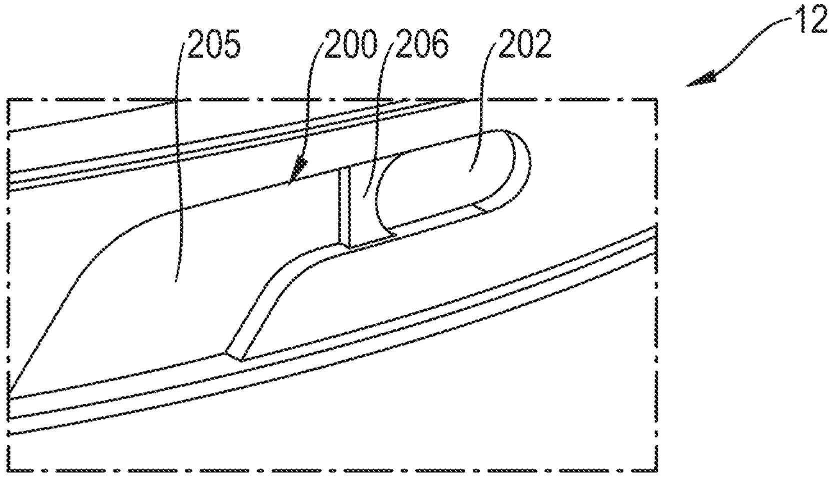
FIG. 7 shows a simplified three-dimensional view of a detail of a head part designed to interact with the insert according to FIG. 6.
Figure 8:
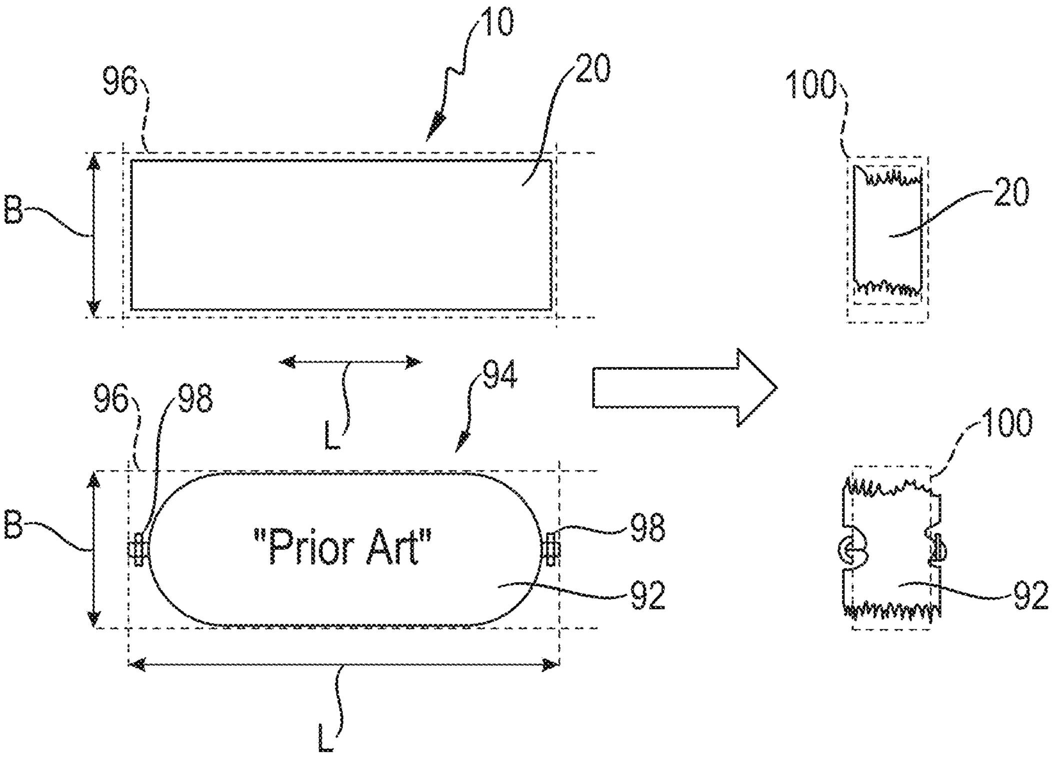
FIG. 8 shows a schematic comparison which compares the chamber from FIG. 1 with a chamber known from the prior art and its dispensing behavior.

In the drawings, identical and equivalent components are provided with the same reference signs. In the drawings:

FIG. 1 is a longitudinal section through a cartridge according to the invention in a first embodiment in an exploded view;

FIG. 2 is a simplified sectional view of a detail of the cartridge according to FIG. 1 in the assembled position, where a connecting device for connecting an insert to a head part can be seen in more detail;

FIG. 3 is a simplified view of a detail of the cartridge according to FIG. 2;

FIG. 4 is a simplified three-dimensional view of a detail of the head part of the cartridge according to FIG. 2 in isolation;

FIG. 5 is a simplified three-dimensional view of the use of the cartridge according to FIG. 2 in isolation;

FIG. 6 is a simplifiedthree-dimensional view of an alternatively designed insert of a cartridge in isolation;

FIG. 7 is a simplified three-dimensional view of a detail of a head part designed to interact with the insert according to FIG. 6; and FIG. 8 is a schematic comparison which compares the chamber from FIG. 1 with a chamber known from the prior art and its dispensing behavior.

EMBODIMENTS

FIG. 1 is an exploded view of a cartridge 10 in a longitudinal section.

The cartridge 10 comprises a head part 12, two covers 14, two inserts 16 and two film pouches 18.

The film pouches 18 are inherently non-rigid and each have a cylindrical and substantially elongate shape. The film pouches 18 each delimit a chamber 20 and have an opening 22, the chamber 20 being in particular sealingly closable by means of the film pouches 18.

In the embodiment shown, the film pouch 18 is formed by a base part 24 and a film tube 26. The base part 24 has a base 28 and a collar 30 extending around the base 28. The film tube 26 is attached on the outside of the collar 30 by welding or gluing. In principle, the film tube 26 can also be attached to the inside of the collar 30 by welding or gluing.

The film tube 26 can be produced, for example, from a film by gluing or welding edge regions, It is also possible for a prefabricated film tube or a prefabricated film pouch to be used.

The base 28 is, for example, circular, such that the chamber 20 is cylindrical. In principle, however, any shape of the base 28 is conceivable, for example rectangular or polygonal.

The insert 16 is inherently rigid and is inserted on the inside through the opening 22 at least partially into the corresponding chamber 20 of an associated film pouch 18.

The insert 16, which can be seen in more detail in FIGS. 2, 3 and 5, has a curved profile on an inner face 38 facing the chamber 20, so that the chamber 20 tapers toward the head part 12.

On a side facing the head part 12 in the longitudinal direction L, the insert 16 has a surface 46 which extends obliquely with respect to a horizontal H extending perpendicularly to the longitudinal direction. The surface 46 facing the head part 12 forms an angle ε of 10-50° with the horizontal H, particularly preferably of approximately 15°-35°.

The inner face 38 of the insert 16 facing the chamber 20 encloses a passage 60 which tapers in the direction of the head part 12.

In principle, the insert 16 is annular, so that it can be coupled to the cylindrical tube 26.

The inside of the film tube 26 is connected to the insert 16, the film tube 26 being connected to an outer face 42 of the insert 16 in the horizontal direction H. The film tube 26 is preferably welded or glued to the insert 16.

The cover 14 is provided between the head part 12 and the insert 16. as can be seen from FIG. 1, In the assembled state of the cartridge 10, the cover 14 rests in radially outer regions on the surface 46.

The cover 14 is connected to the insert 16, for example by welding or gluing, and closes the passage 60. Accordingly, the cover 14 closes the chamber 20, so that the chamber 20 is preferably completely sealed in the assembled state of the cover 14.

In the embodiment shown in FIG. 1, the head part 12 has two receptacles 66, which interact with the inserts 16 and the cover 14 in the assembled state. The receptacle 66 is divided into two regions, an insert 16 and a film pouch 18 being assigned to each region.

A connecting device 200, which can be seen in FIGS. 1 to 5, is provided for form-fitting connection of the insert 16 to the head part 12. For this purpose, the insert 16 has at least one first connecting element 201 designed as a latching lug and the head part 12 has at least one second connecting element 202 designed as a counter-latching element, The at least one second connecting element 202 is designed as a latching slot in the present case.

The connecting device 200 can be used to achieve a defined position of the insert 16 relative to the head part 12 in the longitudinal direction L in a simple manner in the assembled state, such that a defined opening behavior of the cover 14 can be achieved and thus undesired waste is advantageously low.

As can be seen in greater detail in FIGS. 4 and 5, for example, six latching lugs 201 and six latching slots 202 are provided in each case. The positions of the connecting elements 201 and 202 are coordinated with one another and can be distributed uniformly or non-uniformly over the relevant circumference. A non-uniform distribution has the advantage that the connection of the insert 16 to the head part 12 is possible only in a defined position.

In the embodiment shown with a plurality of latching slots 202, there is a ridge 203 in each case between two latching slots 202 that are adjacent in the circumferential direction. Since the latching lugs 201 and the latching slots 202 in the present case have extents that substantially correspond to one another in the circumferential direction, an interaction of the latching lugs 201 with the respective ridges 203 prevents a rotation of the insert 16 relative to the head part 12 in the assembled state.

The connecting device 200 is designed to be detachable, i.e. the latching lugs 201 can be brought into engagement reversibly with the latching slots 202. The latching lugs 201 can be coordinated with the latching slots 202 such that the latching lugs 201 release from the latching slots 202 when a force acting in the longitudinal direction L in a direction facing away from the head part 12 exceeds a defined limit value. This can prevent damage to the head part 12, the insert 16 and the film pouch 18.

The number of connecting elements 202 can vary in alternative embodiments of the invention; for example, a single complete connecting element can also be provided, which can be arranged in an undercut of the head part.

The receptacle 66 further comprises an expansion region 72 which is designed as a depression in the receptacle 66 and, as can be seen in FIG. 1, forms an expansion space 74, which has an expansion height 90.

The head part 12 also has an outlet nozzle 76 with an outlet opening 78 and an outlet channel 80. The outlet opening 78 is in fluid connection with the expansion space 74 and the receptacle 66 via the outlet channel 80.

The outlet nozzle 76 shown in FIG. 1 has two outlet channels 80 which are in fluid connection with the particular receptacle 66 and are separated from one another by a partition 82 which extends from a connecting piece 84 separating the receptacles 66 to the outlet opening 78.

It is possible for the two outlet channels 80, as shown in FIG. 1, to have different cross-sections, in particular different diameters, in order to set a mixing ratio of the compositions, as will be explained below.

The outlet nozzle 76 also has a thread 86 by means of which an attachment (not visible) can be attached to the outlet opening 78 of the head part 12. This attachment can be part of a dispensing device into which the cartridge 10 can be inserted or placed.

FIG. 6 shows an alternatively designed insert 16 which can be used as an alternative to the insert 16 shown in FIGS. 1 to 5. FIG. 7 shows a detail of a head part 12, which is designed to interact with the insert 16 according to FIG. 6.

In the following, only the differences between the insert 16 according to FIG. 6 and the head part 12 according to FIG. 7 and the insert 16 or head part 12 shown in FIGS. 1 to 5 will be discussed.

A connecting device 200 is provided for connecting the insert 16 to the head part 12, the insert 16 in the present case having four projections 201 which are substantially uniformly distributed in the circumferential direction and which are inwardly directed in the radial direction and here have an elongate shape in the circumferential direction, although they can also be circular, elliptical, angular, rectangular or the like in alternative embodiments. The projections 201 are connecting elements 201 of the connecting device 200 which are designed to interact with connecting elements 202 in the form of recesses in the head part 12.

The connecting device 200 is a bayonet connecting device in this case, such that the insert 16, for connection to the head part 12, initially engages a guide device 205 of the connecting element 202 substantially in the axial direction L and, for fixing to the head part 12, is rotated relative to the head part 12 substantially in the circumferential direction.

The guide device 203 or guide track has a ridge 206, such that the recess 202 of the guide track 205 here substantially corresponds to the shape of the connecting element 201 and the insert 16 is securely held in a defined position on the head part 12 up to a defined external force when the connecting elements 201 are in engagement with the recesses 202.

In contrast to the embodiment according to FIGS. 1 to 5, the insert 16 according to FIG. 6 can be connected to the head part 12 according to FIG. 7 from a radially outer side.

FIG. 8 shows a schematic comparison between the chamber 20 of the cartridge 10, which is arranged in the upper half of FIG. 8, and a chamber 92 of a cartridge 94 known from the prior art, which is arranged in the lower half of FIG. 6, in a longitudinal section.

The left-hand side of FIG. 8 shows the cartridges 10, 94 in a filled state and the right-hand side of FIG. 8 shows the cartridges 10, 94 in a dispensed or emptied state.

In the filled state, the cartridges 10, 94 in the present example are enclosed by a cuboid 96 of equal volume, which is shown with dashed lines. A width B, a length L and a height (not shown) of the two cuboids 96 are substantially the same here.

The chamber 92 of the cartridge 94 from the prior art is closed on both sides by clips 98. The clips 98 result in the chamber 92 being closed in a spherical manner at each end, such that the chamber 92 has a smaller volume than the cuboid 96 according to the cartridge 10 according to the invention. Accordingly, more composition can be filled into the chamber 20 than into the chamber 92.

The dispensing of the cartridges 10, 94, represented by an arrow, results in the long sides of the chambers 20, 92 being compressed and arching in the manner of an accordion.

The chamber 20 of the dispensed cartridge 10 is enclosed by a cuboid 100. The cuboid 100 is smaller than the cuboid that encloses the dispensed chamber 92 from the prior art, such that the dispensed chamber 20 has a smaller volume than the dispensed chamber 92 from the prior art. Accordingly, the cartridge 10 can accommodate more composition than the cartridge 94 known from the prior art, with the same available initial volume according to cuboid 96. and less composition remains in the cartridge 10 after dispensing compared to the cartridge 94 from the prior art, In the embodiments shown, the cartridge 10 comprises one or two chambers 20 and a corresponding number of covers 14, inserts 16, film pouches 18, receptacles 66 and outlet channels 80. In general, any number of the components mentioned is possible.

The invention claimed is:

1. A cartridge for a dispensing device, having:

at least one first non-rigid, elongate film pouch, which has a chamber for receiving a first composition, at least one second non-rigid, elongate film pouch, which has a chamber for receiving a second composition, a head part for interacting with the at least one first non-rigid, elongate film pouch and the at least one second non-rigid, elongate film pouch and having a first rigid insert, the first rigid insert being connected to the at least one first non-rigid, clongate film pouch on a side facing the head part, the head part further having a second rigid insert, the second rigid insert being connected to the at least one second non-rigid, elongate film pouch on a side facing the head part, a first connecting device which can connect the first rigid insert to the head part in a form-fitting and/or force-fitting manner, and a second connecting device which can connect the second rigid insert to the head part in a form-fitting and/or force-fitting manner, wherein the first rigid insert and the second rigid insert each have at least one first connecting element of the connecting device and the head part has at least one second connecting element of the connecting device, wherein the at least one first non-rigid, elongate film pouch and the at least one second non-rigid, elongate film pouch are each formed by a cylindrical film tube which is closed at a bottom by a base part, wherein the first connecting device comprises a completely surrounding latching lug which connects with a corresponding counter element of the first connecting device, such that a sealing connection can be achieved, wherein the head part further comprises a first expansion space and a first outlet channel having a first diameter for outflow of the first composition from the first non-rigid, elongate film pouch at a first flow rate, and wherein the head part further comprises a second expansion space and a second outlet channel having a second diameter different from the first diameter for outflow of the second composition from the second non-rigid, elongate film pouch at a second flow rate different from the first flow rate.

2. The cartridge according to claim 1, wherein the first connecting device is detachable, and/or wherein the second connecting device is detachable.

3. The cartridge according to claim 1, wherein the first connecting device has a latching lug which extends completely around a circumference in a circumferential direction, and which interacts with a corresponding counter-element, and/or wherein the second connecting device has a latching luo which extends completely around a circumference in a circumferential direction, and which interacts with a corresponding counter-element.

4. The cartridge according to claim 1, wherein the at least one second connecting element of the first connecting device and/or the at least one second connecting element of the second connecting device has a positioning element which can fix a position of the rigid insert relative to the head part in a defined manner in a circumferential direction.

5. The cartridge according to claim 1, wherein the first connecting device is designed as the latching connection, and wherein a plurality of the at least one first connecting element of the latching connection can be brought into engagement with a plurality of the at least one second connecting element of the latching connection, and/or wherein the second connecting device is designed as the latching connection, and wherein a plurality of the at least one first connecting element of the latching connection can be brought into engagement with a plurality of the at least one second connecting element of the latching connection.

6. The cartridge according to claim 1, wherein the first rigid insert and/or the second rigid insert has a passage closed by a cover.

7. The cartridge according to claim 1, wherein the base part of the at least one first non-rigid, elongate film pouch and/or the at least one second non-rigid, elongate film pouch is glued and/or welded to the cylindrical film tube.

8. The cartridge according to claim 1, wherein the first non-rigid, elongate film pouch is filled with the first composition and/or wherein the second non-rigid, elongate film pouch is filled with the second composition.

9. The cartridge according to claim 8, wherein the first composition and/or the second composition comprises a multi-component mortar, a multi-component coating compound, a multi-component paint, a multi-component foam precursor, a multi-component adhesive, a multi-component sealing compound, a multi-component lubricant, or a resin.

10. The cartridge according to claim 1, wherein the first composition is different from the second composition.

11. The cartridge according to claim 10, wherein the head part is designed such that the first composition and the second composition are configured to be guided separately from one another in the region of the head part up to an outlet opening.

12. The cartridge according to claim 1, wherein the first outlet channel and the second outlet channel each run separately from one another in the region of the head part up to an outlet opening.

13. The cartridge according to claim 1, wherein the head part is designed such that the first composition and the second composition are configured to be guided separately from one another in the region of the head part up to an outlet opening.

14. The cartridge according to claim 1, wherein, in the at least one first non-rigid, elongate film pouch and/or in the at least one second non-rigid, elongate film pouch, the base part has a base and a collar extending around the base, and wherein the film tube is attached on the outside of the collar by welding.

15. The cartridge according to claim 1, wherein the first rigid insert and the second rigid insert are each respectively inserted into the first non-rigid, elongate film pouch and the second non-rigid, elongate film pouch on a side facing the head part.

16. The cartridge according to claim 1, wherein, in the first rigid insert and/or in the second rigid insert, the first connecting element comprises a plurality of lugs and the second connecting element comprises a plurality of slots.

17. The cartridge according to claim 16, which comprises six latching lugs and six latching slots which are coordinated with one another.

18. The cartridge according to claim 16, wherein there is a ridge in each case between two latching slots that are adjacent in the circumferential direction and the lugs and slots have extents that substantially correspond to one another in the circumferential direction.

19. The cartridge according to claim 1, which is not adapted to be engaged with a plunger or piston.

* * * * *